United States Patent
Watabe et al.

(10) Patent No.: US 11,575,140 B2
(45) Date of Patent: Feb. 7, 2023

(54) LIQUID COMPOSITION, METHOD FOR PRODUCING IT, AND METHOD FOR PRODUCING MEMBRANE/ELECTRODE ASSEMBLY

(71) Applicant: AGC Inc., Chiyoda-ku (JP)

(72) Inventors: Hiroyuki Watabe, Chiyoda-ku (JP); Satoru Hommura, Chiyoda-ku (JP); Jun Kato, Chiyoda-ku (JP); Tatsuya Miyajima, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 229 days.

(21) Appl. No.: 15/861,095

(22) Filed: Jan. 3, 2018

(65) Prior Publication Data
US 2018/0131026 A1   May 10, 2018

Related U.S. Application Data

(63) Continuation of application No. PCT/JP2016/069523, filed on Jun. 30, 2016.

(30) Foreign Application Priority Data

Jul. 8, 2015 (JP) .............................. JP2015-137107

(51) Int. Cl.
   *H01M 8/1006* (2016.01)
   *C08F 14/26* (2006.01)
   (Continued)

(52) U.S. Cl.
   CPC .......... *H01M 8/1006* (2013.01); *C08F 14/18* (2013.01); *C08F 14/26* (2013.01); *C08F 16/24* (2013.01);
   (Continued)

(58) Field of Classification Search
   CPC ....... H01M 8/1006; H01M 2008/1095; H01M 8/1004; H01M 8/1023; H01M 8/1039; H01M 8/8668; H01M 2300/0082
   See application file for complete search history.

(56) References Cited

U.S. PATENT DOCUMENTS 6,933,071 B1 * 8/2005 Yoshitake ........... H01M 8/1007
                                                              429/246
2007/0122676 A1   5/2007 Song
(Continued)

FOREIGN PATENT DOCUMENTS

CN        102471412 A        5/2012
JP        2004-107461    *   4/2004   .............. H01M 8/02
(Continued)

OTHER PUBLICATIONS

International Search Report dated Jul. 26, 2016 in PCT/JP2016/069523, filed on Jun. 30, 2016.

*Primary Examiner* — Osei K Amponsah
(74) *Attorney, Agent, or Firm* — Element IP, PLC

(57) ABSTRACT

To provide a liquid composition with which a catalyst layer and a polymer electrolyte membrane will hardly be broken at the time of their formation and a method for producing the liquid composition; and a method for producing a membrane/electrode assembly by which a catalyst layer and a polymer electrolyte membrane will hardly be broken at the time of their formation.

A liquid composition comprising a polymer having ion exchange groups, water and an organic solvent, wherein
the average secondary particle size of the polymer having ion exchange groups is from 100 to 3,000 nm, and
the primary particle size parameter represented by the product of the average primary particle size (nm) and
(Continued)

the ion exchange capacity (meq/g dry resin) of the polymer having ion exchange groups, is from 12 to 20.

16 Claims, 2 Drawing Sheets

(51) Int. Cl.

| | |
|---|---|
| C08F 16/24 | (2006.01) |
| C08J 3/02 | (2006.01) |
| C08L 101/02 | (2006.01) |
| C08F 14/18 | (2006.01) |
| H01M 8/1023 | (2016.01) |
| H01M 8/1039 | (2016.01) |
| H01M 4/86 | (2006.01) |
| H01M 8/1004 | (2016.01) |
| H01M 8/10 | (2016.01) |

(52) U.S. Cl.
CPC ............. *C08J 3/02* (2013.01); *C08L 101/02* (2013.01); *H01M 4/8668* (2013.01); *H01M 8/1004* (2013.01); *H01M 8/1023* (2013.01); *H01M 8/1039* (2013.01); *H01M 2008/1095* (2013.01); *H01M 2300/0082* (2013.01); *Y02P 70/50* (2015.11)

(56) References Cited

U.S. PATENT DOCUMENTS

| | | |
|---|---|---|
| 2008/0193821 A1 | 8/2008 | Shimohira et al. |
| 2011/0027688 A1* | 2/2011 | Hommura ........... H01M 8/1039 521/38 |
| 2013/0252134 A1 | 9/2013 | Takami et al. |
| 2015/0044593 A1 | 2/2015 | Tanuma et al. |

FOREIGN PATENT DOCUMENTS

| | | | |
|---|---|---|---|
| JP | 2005-82749 A | 3/2005 | |
| JP | 2007-149691 | 6/2007 | |
| JP | 2011-253788 | * 12/2011 | ............. H01M 8/02 |
| JP | 2013-139573 | 7/2013 | |
| JP | 2014-502776 | 2/2014 | |
| JP | 2014-225424 | 12/2014 | |

* cited by examiner

LIQUID COMPOSITION, METHOD FOR PRODUCING IT, AND METHOD FOR PRODUCING MEMBRANE/ELECTRODE ASSEMBLY

This application is a continuation of PCT Application No. PCT/JP2016/069523, filed on Jun. 30, 2016, which is based upon and claims the benefit of priority from Japanese Patent Application No. 2015-137107 filed on Jul. 8, 2015. The contents of those applications are incorporated herein by reference in their entireties.

TECHNICAL FIELD

The present invention relates to a liquid composition, a method for producing it, and a method for producing a membrane/electrode assembly.

BACKGROUND ART

A polymer electrolyte fuel cell is, for example, a stack of a plurality of cells, each comprising a membrane/electrode assembly sandwiched between two separators. The membrane/electrode assembly comprises an anode and a cathode each having a catalyst layer, and a polymer electrolyte membrane disposed between the anode and the cathode.

The polymer electrolyte membrane in the membrane/electrode assembly is formed, for example, by applying and drying a liquid composition containing a polymer having ion exchange groups, water and an organic solvent. Further, the catalyst layer in the membrane/electrode assembly is formed, for example, by applying and drying a catalyst layer-forming coating liquid having the liquid composition and a catalyst mixed.

However, the catalyst layer and the polymer electrolyte membrane containing the polymer having ion exchange groups are fragile and are readily broken. Particularly in a case where the polymer having ion exchange groups is a polymer having structural units based on a perfluoromonomer having an ion exchange groups and structural units based on a perfluoromonomer having a 5-membered ring, the catalyst layer and the polymer electrolyte membrane are readily broken (Patent Document 1).

PRIOR ART DOCUMENTS

Patent Documents

Patent Document 1: JP-A-2014-502776

DISCLOSURE OF INVENTION

Technical Problem

The present invention provides a liquid composition with which a catalyst layer and a polymer electrolyte membrane will hardly be broken at the time of their formation and a method for producing the liquid composition; and a method for producing a membrane/electrode assembly by using the liquid composition with which a catalyst layer and a polymer electrolyte membrane will hardly be broken at the time of their formation.

Solution to Problem

The present invention provides the following embodiments.

[1] A liquid composition comprising a polymer having ion exchange groups, water and an organic solvent, wherein
the average secondary particle size of the polymer having ion exchange groups is from 100 to 3,000 nm, and
the primary particle size parameter represented by the product of the average primary particle size (nm) and the ion exchange capacity (meq/g dry resin) of the polymer having ion exchange groups, is from 12 to 20.

[2] The liquid composition according to [1], which contains, as the organic solvent, at least one $C_{1-4}$ alcohol.

[3] The liquid composition according to [1] or [2], wherein the polymer having ion exchange groups is a perfluoropolymer having ion exchange groups.

[4] The liquid composition according to any one of [1] to [3], wherein the polymer having ion exchange groups is a polymer obtained by converting precursor groups of the following polymer (F) into ion exchange groups:

polymer (F): a polymer having structural units based on a perfluoromonomer having a precursor group represented by the following formula (g1), and structural units based on a perfluoromonoene monomer having a 5-membered ring or a perfluorodiene monomer capable of forming a 5-membered ring by cyclopolymerization:

wherein $Q^1$ is a perfluoroalkylene group which may have an etheric oxygen atom, $Q^2$ is a single bond or a perfluoroalkylene group which may have an etheric oxygen atom, and Y is a fluorine atom or a monovalent perfluoroorganic group.

[5] The liquid composition according to [4], wherein the polymer (F) further has structural units based on tetrafluoroethylene.

[6] The liquid composition according to any one of [1] to [5], wherein the concentration of the polymer having ion exchange groups in the liquid composition is from 10 to 26 mass %.

[7] A method for producing the liquid composition as defined in any one of [1] to [6], which comprises the following steps (1) and (2):

step (1): a step of preparing a mixed liquid containing the polymer having ion exchange groups, water and the organic solvent, at a concentration of the polymer having ion exchange groups of from 12 to 30 mass % with a proportion of water of from 10 to 40 mass % based on the total amount of water and the organic solvent;

step (2): a step of stirring the mixed liquid at a shear rate of at least 50 s$^{-1}$ with heating it to 100 to 150° C. to increase the viscosity of the mixed liquid, and keeping stirring until the viscosity of the mixed liquid is decreased and stabilized.

[8] A polymer electrolyte membrane formed from the liquid composition as defined in any one of [1] to [6].

[9] A method for producing a polymer electrolyte membrane, which comprises applying the liquid composition as defined in any one of [1] to [6] to a substrate, and removing water and the organic solvent.

[10] A membrane/electrode assembly for a polymer electrolyte fuel cell, which comprises an anode having a catalyst layer, a cathode having a catalyst layer and a polymer electrolyte membrane disposed between the anode and the cathode, wherein the catalyst layer of at least one of the cathode and the anode is a catalyst layer formed from a mixed liquid of the liquid composition as defined in any one of [1] to [6] and a catalyst.

[11] A method for producing a membrane/electrode assembly for a polymer electrolyte fuel cell comprising an anode having a catalyst layer, a cathode having a catalyst layer and a polymer electrolyte membrane disposed between the anode and the cathode, which comprises preparing a mixed liquid containing the liquid composition as defined in any one of [1] to [6] and a catalyst, and forming the catalyst layer of at least one of the cathode and the anode by using the mixed liquid.

[12] A membrane/electrode assembly for a polymer electrolyte fuel cell, which comprises an anode having a catalyst layer, a cathode having a catalyst layer and a polymer electrolyte membrane disposed between the anode and the cathode, wherein the polymer electrolyte membrane is a polymer electrolyte membrane formed from the liquid composition as defined in any one of [1] to [6].

[13] A method for producing a membrane/electrode assembly for a polymer electrolyte fuel cell comprising an anode having a catalyst layer, a cathode having a catalyst layer and a polymer electrolyte membrane disposed between the anode and the cathode, which comprises forming the polymer electrolyte membrane by using the liquid composition as defined in any one of [1] to [6].

Advantageous Effects of Invention

According to the liquid composition of the present invention, a catalyst layer and a polymer electrolyte membrane will hardly be broken at the time of their formation.

According to the method for producing a liquid composition of the present invention, it is possible to produce a liquid composition with which a catalyst layer and a polymer electrolyte membrane will hardly be broken at the time of their formation.

According to the method for producing a membrane/electrode assembly of the present invention, a catalyst layer and a polymer electrolyte membrane will hardly be broken at the time of their formation.

DESCRIPTION OF EMBODIMENTS

Figure 1:
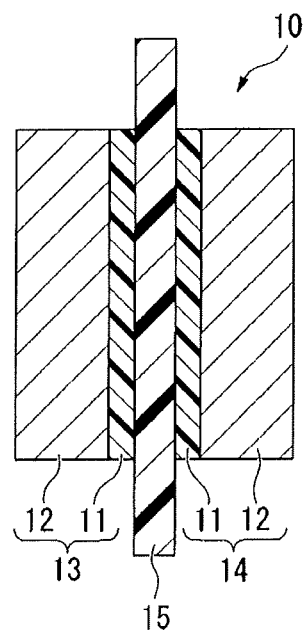
FIG. 1 is a cross sectional view illustrating an example of a membrane/electrode assembly of the present invention.

In this specification, structural units represented by the formula (u1) will be referred to as units (u1). The structural units represented by other formulae will be referred to in the same manner.

In this specification, a compound represented by the formula (m1) will be referred to as a compound (m1). Compounds represented by other formulae will be referred to in the same manner. Further, in a case where the compound (m1) is a monomer, structural units based on the compound (m1) will be referred to as units (m1). The same applies to other monomer compounds.

In this specification, a group represented by the formula (g1) will be referred to as a group (g1). Groups represented by other formulae will be referred to as in the same manner.

In this specification, meanings of the following terms are as follows.

A "structural unit" means both a unit based on a monomer (that is, a "monomer unit") formed by polymerization of the monomer, and a unit having part of such a monomer unit converted to another structure by treating the polymer.

A "monomer" means a compound having a polymerizable carbon-carbon double bond. A compound having one polymerizable carbon-carbon double bond will sometimes be referred to as a "monoene monomer", and a compound having two polymerizable carbon-carbon double bonds will sometimes be referred to as a "diene monomer".

An "ion exchange group" means a group having $H^+$, a monovalent metal cation, an ammonium ion or the like. The ion exchange group may, for example, be a sulfonic acid group, a sulfonimide group or a sulfone methide group.

A "sulfonic acid group" includes $—SO_3^-H^+$ and $—SO_3^- M^+$ (wherein $M^+$ is a monovalent metal ion, or an ammonium ion wherein one or more hydrogen atoms may be substituted by a hydrocarbon group).

A "precursor group" means a group capable of being converted to an ion exchange group by a known treatment such as hydrolysis or treatment for conversion to an acid form. The precursor group may, for example, be a $—SO_2F$ group.

The "average primary particle size" is a D value calculated by conducting fitting employing Gaussian function with respect to peak positions and vicinities thereof of a scattering profile obtained by small angle X-ray scattering (SAXS) with respect to a sample obtained by diluting the liquid composition to a solid content concentration of 10 mass % without changing the solvent composition.

The "average secondary particle size" is an average particle size calculated by cumulant expansion from autocorrelation function obtained by dynamic light scattering method with respect to a sample obtained by diluting the liquid concentration with ultrapure water to a solid content concentration of 0.2 mass %.

<Liquid Composition>

The liquid composition of the present invention comprises a polymer having ion exchange groups, water and an organic solvent, wherein particles of the polymer having ion exchange groups having specific particle sizes are dispersed in a dispersion medium containing water and the organic solvent.

(Average Secondary Particle Size)

In the liquid composition of the present invention, the average particle size of secondary particles formed by agglomeration of primary particles of the polymer having ion exchange groups, that is, the average secondary particle size is from 100 to 3,000 nm, preferably from 100 to 2,000 nm, more preferably from 150 to 1,500 nm. When the average secondary particle size of the polymer having ion exchange groups is at least the lower limit value of the above range, a catalyst layer and a polymer electrolyte membrane will hardly be broken at the time of their formation. When the average secondary particle size of the polymer having ion exchange groups is at most the upper limit value of the above range, the liquid composition will readily be produced.

(Primary Particle Size Parameter)

The present inventors have conducted extensive studies on whether the catalyst layer and the polymer electrolyte membrane will readily be broken and as a result, found the following. That is, (i) there is such a basic tendency that by increasing the primary particle size of the ion exchange polymer, a catalyst layer and a polymer electrolyte membrane formed of such a polymer will hardly be broken, (ii) however, if the ion exchange capacity of the ion exchange polymer is small, the catalyst layer and the polymer electrolyte membrane will readily be broken even if the primary particle size of the ion exchange polymer is increased, and (iii) on the other hand, when the ion exchange capacity of the ion exchange polymer is large, the catalyst layer and the polymer electrolyte membrane will hardly be broken even if the primary particle size of the ion exchange polymer is small. Therefore, the primary particle size corrected by the ion exchange capacity is newly defined as the "primary particle size parameter", which is taken as the index to unbreakableness of the catalyst layer and the polymer electrolyte membrane formed of such an ion exchange polymer.

In the liquid composition of the present invention, the primary particle size parameter represented by the product of the average primary particle size (nm) and the ion exchange capacity (meq/g dry resin) of the polymer having ion exchange groups is from 12 to 20, preferably from 12 to 17, more preferably from 12 to 15. When the primary particle size parameter of the polymer having ion exchange groups is at least the lower limit value of the above range, a catalyst layer and a polymer electrolyte membrane formed of such a polymer will hardly be broken. When the primary particle size parameter of the polymer having ion exchange groups is at most the upper limit value of the above range, the liquid composition will readily be produced.

(Polymer Having Ion Exchange Groups)

The ion exchange group is preferably a sulfonic acid group, whereby a membrane/electrode assembly with high power generation performance will be obtained.

The sulfonic acid group may be an acid form having $H^+$ as the cation or a salt form having a metal ion, an ammonium ion or the like as the cation. The polymer having sulfonic acid groups in a catalyst layer or a polymer electrolyte membrane is usually in the acid form. Some of the cations of the sulfonic acid groups may be replaced by bivalent or higher metal ions.

The polymer having ion exchange groups is preferably a fluorinated polymer, more preferably a perfluoropolymer wherein all hydrogen atoms bonded to carbon atoms are substituted by fluorine atoms from the viewpoint of excellent chemical durability.

The perfluoropolymer having ion exchange groups may, for example, be the following. Hereinafter, tetrafluoroethylene will be referred to as "TFE", and structural units based on tetrafluoroethylene will be referred to as "TFE units".

A polymer having —$SO_2F$ groups of a polymer having units (m3) and TFE units converted to sulfonic acid groups:

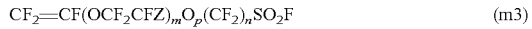

wherein Z is a fluorine atom or a trifluoromethyl group, m is an integer of from 0 to 3, p is 0 or 1, n is from 1 to 12, and m+p>0.

As described above, the units (m3) are structural units based on the compound (m3), and the compound (m3) is a compound represented by the above formula (m3).

A polymer obtained by converting precursor groups of a polymer having the after-mentioned units (A) and TFE units into ion exchange groups (WO2007/013533).

A polymer obtained by converting precursor groups of the polymer (F) into ion exchange groups (WO2011/013578).

The perfluoropolymer having ion exchange groups is particularly preferably a polymer obtained by converting precursor groups of the polymer (F) into ion exchange groups (hereinafter sometimes referred to as "polymer (H)") in view of high proton conductivity.

(Polymer (F))

The polymer (F) is a polymer having structural units based on a perfluoromonomer having a precursor group represented by the following formula (g1) (hereinafter sometimes referred to as "units (A)") and structural units based on a perfluoromonoene monomer having a 5-membered ring or a perfluorodiene monomer capable of forming a 5-membered ring by cyclopolymerization (hereinafter sometimes referred to as "units (B)"). The polymer (F) may further have structural units based on another monomer (hereinafter sometimes referred to as "units (C)") as the case requires.

Units (A):

The units (A) are structural units based on a perfluoromonomer (hereinafter sometimes referred to as monomer (a)) having a group (g1) which is a precursor group of an ion exchange group.

$Q^1$ is a perfluoroalkylene group which may have an etheric oxygen atom.

$Q^2$ is a single bond or a perfluoroalkylene group which may have an etheric oxygen atom.

The number of etheric oxygen atoms, if any, in the perfluoroalkylene group as $Q^1$ or $Q^2$ may be 1 or more. Further, such an oxygen atom may be inserted in a carbon atom/carbon atom bond of the perfluoroalkylene group or may be bonded to a terminal carbon atom.

The perfluoroalkylene group may be linear or branched, and is preferably linear.

The number of carbon atoms in the perfluoroalkylene group is preferably from 1 to 6, more preferably from 1 to 4. When the number of carbon atoms is at most 6, the fluoromonomer to be used as a starting monomer tends to have a low boiling point and is easy to purify by distillation. Further, when the number of carbon atoms is at most 6, the decrease of the ion exchange capacity of the polymer (H) is suppressed, and the decrease of the proton conductivity is suppressed.

$Q^2$ is preferably a $C_{1-6}$ perfluoroalkylene group which may have an etheric oxygen atom. When $Q^2$ is a $C_{1-6}$ perfluoroalkylene group which may have an etheric oxygen atom, excellent stability of the power generation performance will be obtained when a polymer electrolyte fuel cell is operated for a long period of time, as compared with a case where $Q^2$ is a single bond.

It is preferred that at least one of $Q^1$ and $Q^2$ is a $C_{1-6}$ perfluoroalkylene group having an etheric oxygen atom. A fluorinated monomer having a $C_{1-6}$ perfluoroalkylene group having an etheric oxygen atom can be prepared without a fluorination reaction with a fluorine gas, and hence can be produced easily in a good yield.

Y is preferably a fluorine atom or a monovalent perfluoroorganic group.

Y is preferably a fluorine atom or a $C_{1-6}$ linear perfluoroalkyl group which may have an etheric oxygen atom.

The monomer (a) is preferably a compound (m1), whereby the moisture content of the polymer can be kept low even if the electrical conductivity is increased, whereby a higher power generation performance will be exhibited under low or no humidity conditions or under high humidity conditions.

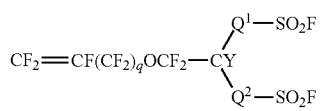
(m1)

$Q^1$, $Q^2$ and Y are as defined for the group (g1).

q is 0 or 1.

As the compound (m1), in view of easy production of the polymer (H) and easy industrial application, compounds (m1-1) to (m1-3) are preferred, and the compound (m1-1) is particularly preferred.

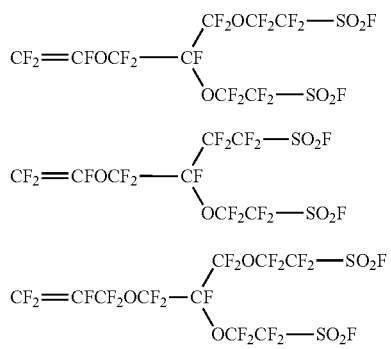

The compound (m1) may be prepared by the method disclosed in e.g. WO2007/013533 or JP-A-2008-202039.

Units (B):

The units (B) are structural units based on a perfluoromonoene monomer having a 5-membered ring (hereinafter sometimes referred to as monomer (b1)) or a perfluorodiene monomer capable of forming a 5-membered ring by cyclopolymerization (hereinafter sometimes referred to as monomer (b2)) (hereinafter the monomer (b1) and the monomer (b2) may sometimes be generally referred to as the monomer (b)).

A 5-membered ring is a cyclic perfluoroorganic group which may have one or two etheric oxygen atoms.

The monomer (b1) is preferably the after-described perfluoro-1,3-dioxole or the after-described perfluoro-1,3-dioxolane having a difluoromethylene group or a perfluoroalkenyl group bonded at the 2-position. The monomer (b2) is preferably the after-described perfluoro(3-butenyl vinyl ether).

As the monomer (b1), for example, compounds (m21) to (m23) may be mentioned, and in view of a high effect to further improve the electrode performance of the polymer, the compound (m21) or (m22) is preferred. The compound (m21) is the above perfluoro-1,3-dioxole, the compound (m22) is the above perfluoro-1,3-dioxolane having a difluoromethylene group bonded at the 2-position, and the compound (m23) is the above perfluoro-1,3-dioxolane having a perfluoroalkenyl group bonded at the 2-position.

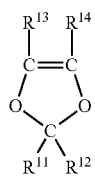
(m21)

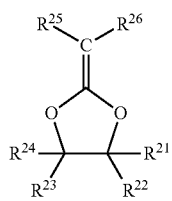
(m22)

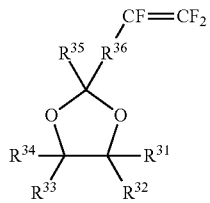
(m23)

$R^{11}$ and $R^{12}$ are each independently a fluorine atom or a $C_{1-5}$ perfluoroalkyl group.

$R^{13}$ and $R^{14}$ are each independently a fluorine atom, a $C_{1-5}$ perfluoroalkyl group or a $C_{1-5}$ perfluoroalkoxy group. In view of high polymerizability, it is preferred that at least one of $R^{13}$ and $R^{14}$ is a fluorine atom, and it is more preferred that both of them are fluorine atoms.

The perfluoroalkyl group and the perfluoroalkoxy group may be linear or branched, and are preferably linear.

$R^{21}$ to $R^{26}$ are each independently a monovalent perfluoroorganic group which may have an etheric oxygen atom, or a fluorine atom. The monovalent perfluoroorganic group is preferably a perfluoroalkyl group. The number of etheric oxygen atoms, if any, in the perfluoroalkyl group may be 1 or more. Further, such an oxygen atom may be inserted in a carbon atom/carbon atom bond of the perfluoroalkyl group or may be bonded to a terminal carbon atom. The perfluoroalkyl group may be linear or branched, and is preferably linear.

In view of high polymerizability, it is preferred that at least one of $R^{25}$ and $R^{26}$ is a fluorine atom, and it is more preferred that both of them are fluorine atoms.

$R^{31}$ to $R^{35}$ are a fluorine atom, a $C_{1-6}$ perfluoroalkyl group, or a $C_{2-6}$ perfluoroalkyl group having an etheric oxygen atom in a carbon atom/carbon atom bond. The number of etheric oxygen atoms, if any, in the perfluoroalkyl group may be 1 or more. The perfluoroalkyl group may be linear or branched, and is preferably linear.

$R^{36}$ is a single bond, a $C_{1-6}$ perfluoroalkylene group or a $C_{2-6}$ perfluoroalkylene group having an etheric oxygen atom in a carbon atom/carbon atom bond. The number of etheric oxygen atoms, if any, in the perfluoroalkylene group may be 1 or more. The perfluoroalkylene group may be linear or branched, and is preferably linear.

As the compound (m21), for example, compounds (m21-1) to (m21-8) may be mentioned, and in view of a higher effect to further improve the electrode performance of the polymer, the compound (m21-1) is particularly preferred.

(m21-1) 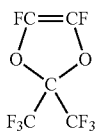

(m21-2) 

(m21-3) 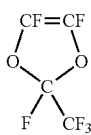

(m21-4) 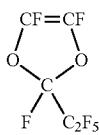

(m21-5) 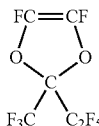

(m21-6) 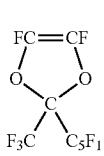

(m21-7) 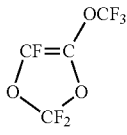

(m21-8) 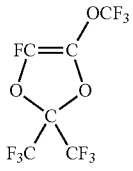

The compound (m22) may, for example, be a compound (m22-1) or a compound (m22-2), and in view of easy preparation and high polymerizability, the compound (m22-1) is particularly preferred.

(m22-1) 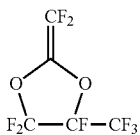

(m22-2) 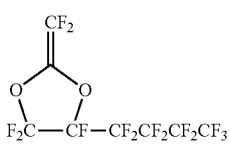

As the compound (m23), for example, compounds (m23-1) and (m23-2) may be mentioned.

(m23-1) 

(m23-2) 

The compound (m21) may be prepared by the method disclosed in e.g. Macromolecule, Vol. 26, No. 22, 1993, pages 5829 to 5834, or JP-A-6-92957.

The compound (m22) may be prepared by the method disclosed in e.g. WO2000/056694, or Izvestiya Akademii Nauk SSSR, Seriya Khimicheskaya, 1989, Vol. 4, pages 938 to 942.

The compound (m23) may be prepared by the method disclosed in e.g. JP-A-2006-241302.

The structural units based on the monomer (b2) are structural units having a 5-membered ring formed by cyclopolymerization. The monomer (b2) may, for example, be a compound (m24), and the structural units based on the compound (m24) are units (u24) represented by the following formula. The compound (m24) is the above perfluoro (3-butenyl vinyl ether).

(m24) 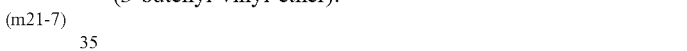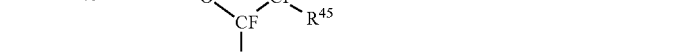

(u24) 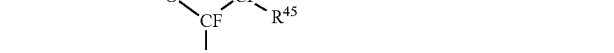

$R^{41}$ to $R^{46}$ are each independently a monovalent perfluoroorganic group which may have an etheric oxygen atom, or a fluorine atom. The monovalent perfluoroorganic group is preferably a perfluoroalkyl group. The number of etheric oxygen atoms, if any, in the perfluoroalkyl group may be 1 or more. Further, such an oxygen atom may be inserted in a carbon atom/carbon atom bond of the perfluoroalkyl group or may be bonded to a terminal carbon bond. The perfluoroalkyl group may be linear or branched, and is preferably linear.

$R^{41}$ to $R^{44}$ are preferably fluorine atoms, in view of high polymerizability.

As the compound (m24), for example, compounds (m24-1) to (m24-3) may be mentioned, and in view of easy preparation of the monomer, the compound (m24-1) is particularly preferred.

$CF_2=CF-O-CF_2-CF_2-CF=CF_2$ (m24-1)

$CF_2=CF-O-CF_2-CF(CF_3)-CF=CF_2$ (m24-2)

$CF_2=CF-O-CF(CF_3)-CF_2-CF=CF_2$ (m24-3)

The compound (m24) may be prepared by the method disclosed in e.g. Macromol. Symp., Vol. 98, 1995, pages 753 to 767.

Units (C):

The units (C) are structural units based on a monomer other than the monomers (a) and (b) (hereinafter sometimes referred to as monomer (c)).

The monomer (c) may, for example, be TFE, chlorotrifluoroethylene, trifluoroethylene, vinylidene fluoride, vinyl fluoride, ethylene, propylene, perfluoro α-olefin (such as hexafluoropropylene), a (perfluoroalkyl)ethylene (such as (perfluorobutyl)ethylene), a (perfluoroalkyl)propene (such as 3-perfluorooctyl-1-propene) or a perfluoro(alkyl vinyl ether). The monomer (c) is particularly preferably TFE. TFE, which has high crystallinity, has an effect to suppress swelling of the polymer (H) when hydrated, and can reduce the moisture content of the polymer (H).

Since the ion exchange capacity of the polymer (H) is determined by the content of the units (A) in the polymer (F) and, as described hereinafter, the ion exchange capacity of the polymer (H) is preferably from 1.1 to 2.0 meq/g dry resin, the content of the units (A) in the polymer (F) is preferably such that the ion exchange capacity of the polymer (H) will be from 1.1 to 2.0 meq/g dry resin. The content of the units (A) which achieves such an ion exchange capacity is preferably from 8 to 19 mol %, more preferably from 13 to 18 mol % based on all the structural units of the polymer (F). When the proportion of the units (A) is at least the above lower limit value, the polymer (H) will have favorable solubility or dispersibility, whereby a liquid composition will readily be prepared. When the proportion of the units (A) is at most the above upper limit value, overswelling of an electrolyte membrane and flooding of a catalyst layer will be suppressed, and the membrane/electrode assembly will exhibit excellent power generation properties even under low temperature and high humidity conditions.

The content of the units (B) in the polymer (F) is preferably from 30 to 80 mol %, more preferably from 65 to 80 mol %. When the proportion of the units (B) is at least the above lower limit value, the membrane/electrode assembly will exhibit excellent power generation properties even under low temperature and high humidity conditions. When the proportion of the units (B) is at most the above upper limit value, the glass transition point of the polymer will not be too high, overswelling of an electrolyte membrane and flooding of a catalyst layer tend to be suppressed, and the membrane/electrode assembly will exhibit excellent power generation properties even under low temperature and high humidity conditions.

The content of the units (C) in the polymer (F) is preferably from 0 to 62 mol %, more preferably from 0 to 20 mol %. In a case where the units (C) are TFE units, the content of the TFE units in the polymer (F) is preferably from 0 to 62 mol %, more preferably from 1 to 27 mol %. In a case where the units (C) are TFE units, when the proportion of the TFE units is at least the above lower limit value, crystallinity by TFE can be imparted, and excellent mechanical strength will be achieved. When the proportion of the TFE units is at most the above upper limit value, the polymer (H) will have favorable solubility or dispersibility, and a liquid composition will readily be prepared. In a case where the units (C) are not TFE units, when the proportion of the units (C) is at most the above upper limit value, overswelling of an electrolyte membrane and flooding of a catalyst layer tend to be suppressed.

Density:

The density of the polymer (F) is preferably at most 2.03 g/cm³, more preferably from 1.80 to 2.00 g/cm³, further preferably from 1.85 to 1.97 g/cm³. When the density is at most 2.03 g/cm³, the obtainable membrane/electrode assembly will be excellent in the power generation properties even under low or no humidity conditions.

To adjust the density of the polymer (F) to be at most 2.03 g/cm³, for example, a method of increasing the proportion of the units (B) in the polymer (F) may be mentioned.

The density of the polymer (F) is a specific gravity obtained by method of collecting gas over water. Specifically, the mass of the polymer (F) is measured in the air, and in the mass of the polymer (F) submerged in water at 20° C. is measured to calculate the specific gravity at 20° C. Employing that the density of water at 4° C. is 0.999973 g/cm³, the specific gravity of the polymer (F) at 20° C. is calculated to the specific gravity at 4° C. The specific gravity at 4° C. obtained by the method of collecting gas over water has the same meaning as the density within the significant figure range (two significant figures) of the density in the present invention. Therefore, the specific gravity obtained by the method of collecting gas over water is taken as the density in the present invention.

Production of Polymer (F):

The polymer (F) is produced by polymerizing the monomer (a) and the monomer (b) and as the case requires, the monomer (c).

As the polymerization method, for example, the method disclosed in WO2011/013578 may be mentioned.

(Polymer (H))

The polymer (H) is a polymer obtained by converting precursor groups of the polymer (F) into ion exchange groups, and is a polymer having structural units having an ion exchange group (hereinafter referred to as units (A')) and units (B) and as the case requires, units (C).

Units (A'):

The units (A') are structural units formed by converting the precursor group in the units (A) to an ion exchange group.

The ion exchange group is preferably a group (g'1) derived from the above group (g1).

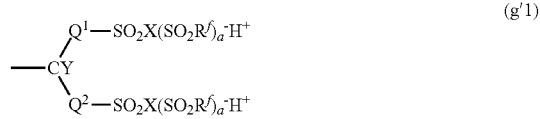

$Q^1$, $Q^2$ and Y are as defined for the group (g1).

$R^f$ is a linear or branched perfluoroalkyl group which may have an etheric oxygen atom. The number of carbon atoms in the perfluoroalkyl group is preferably from 1 to 8, more preferably from 1 to 6. In a case where the group (g'1) has at least two $R^f$, the respective $R^f$ may be the same group or may be different groups.

X is an oxygen atom, a nitrogen atom or a carbon atom, and a=0 when X is an oxygen atom, a=1 when X is a nitrogen atom, and a=2 when X is a carbon atom.

The group (g'1) may be a sulfonic acid group ($-SO_3^-H^+$ group), a sulfonimide group (a $-SO_2N(SO_2R^f)^-H^+$ group) or a sulfone methide group ($-SO_2C(SO_2R^f)_2)^-H^+$ group).

The units (A') are preferably units (u1) derived from structural units based on the compound (m1), since the moisture content of the polymer can be kept low even if the electrical conductivity is increased, whereby a further higher power generation performance can be exhibited under low or no humidity conditions or under high humidity conditions.

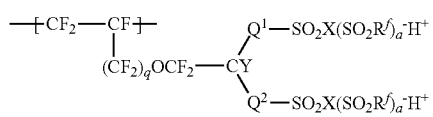

$Q^1$, $Q^2$ and Y are as defined for the group (g1).
q is as defined for the compound (m1).
$R^f$, X and a are as defined for the group (g'1).

As the units (u1), in view of easy production of the polymer (H) and easy industrial application, units (u1-1) to (u1-3) are preferred, and the units (u1-1) are particularly preferred.

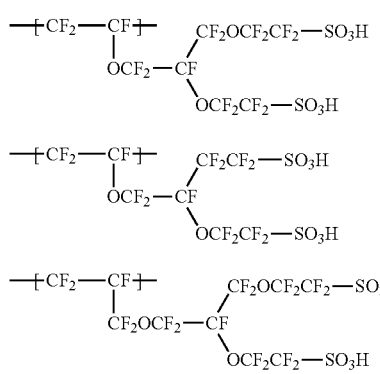

Ion Exchange Capacity:

The ion exchange capacity of the polymer having ion exchange groups is preferably from 1.1 to 2.0 meq/g dry resin, more preferably from 1.1 to 1.6 meq/g dry resin. When the ion exchange capacity is at least the lower limit value of the above range, such a polymer having ion exchange groups has high electrical conductivity and accordingly when used for a catalyst layer of a polymer electrolyte fuel cell, a sufficient cell output will be obtained. When the ion exchange capacity is at most the upper limit value of the above range, a polymer having a low density will readily be prepared.

In a case where the polymer having ion exchange groups is the polymer (H), in order to adjust the ion exchange capacity of the polymer (H), the proportion of the monomer (a) when the polymer (F) is prepared is adjusted. Specifically, it is important to control the monomer composition at the time of polymerization, and thus it is necessary to determine the charge composition considering the polymerizability of the monomer. Further, in a case where at least two types of monomers are to be reacted, it is possible to make the reaction proceed at a constant composition by successively or continuously adding a monomer with a higher reactivity.

Production of polymer having ion exchange groups:

The polymer having ion exchange groups is produced by converting, of a polymer having precursor groups to be ion exchange groups, the precursor groups to ion exchange groups. In a case where the polymer having ion exchange groups is the polymer (H), the polymer (H) is produced by converting the precursor groups of the polymer (F) to ion exchange groups.

To convert the precursor groups to ion exchange groups, the method disclosed in WO2011/013578 may be mentioned. For example, to convert —$SO_2F$ groups to sulfonic acid groups (—$SO_3^-H^+$ groups), a method of hydrolyzing —$SO_2F$ groups of the polymer (F) into a sulfonate, and converting the sulfonate to an acid form thereby to convert the sulfonate salt into sulfonic acid groups may be mentioned.

(Dispersion Medium)

The dispersion medium contains water and an organic solvent.

Water improves dispersibility of the polymer having ion exchange groups in the dispersion medium.

The organic solvent makes a catalyst layer and a polymer electrolyte membrane be hardly broken at the time of their formation. The organic solvent is preferably an organic solvent compatible with water.

The organic solvent is, from such a viewpoint that a catalyst layer and a polymer electrolyte membrane will hardly be broken at the time of their formation, preferably at least one $C_{1-4}$ alcohol.

The $C_{1-4}$ alcohol may, for example, be methanol, ethanol, 1-propanol, 2-propanol, 1-butanol, 2,2,2-trifluoroethanol, 2,2,3,3,3-pentafluoro-1-propanol, 2,2,3,3-tetrafluoro-1-propanol, 1,1,1,3,3,3-hexafluoro-2-propanol, 3,3,3-trifluoro-1-propanol, 2-butanol, 2-methyl-1-propanol or 2-methyl-2-propanol.

The proportion of water is preferably from 10 to 60 mass %, more preferably from 10 to 40 mass % based on the total amount of water and the organic solvent.

When the proportion of water and the organic solvent is within the above range, the polymer having ion exchange groups is excellent in dispersibility in the dispersion medium, and a catalyst layer and a polymer electrolyte membrane will hardly be broken at the time of their formation.

The concentration of the polymer having ion exchange groups in the liquid composition is preferably from 10 to 26 mass %, more preferably from 10 to 24 mass %. When the concentration of the polymer having ion exchange groups is at least the lower limit value of the above range, the catalyst layer-forming coating liquid will readily be prepared. When the concentration of the polymer having ion exchange groups is at most the upper limit value of the above range, the liquid composition will have favorable flowability, and a catalyst layer and a polymer electrolyte membrane will readily be formed.

(Method for Producing Liquid Composition)

The liquid composition of the present invention wherein the primary particle size parameter of the polymer having ion exchange groups is within a specific range, can be produced by a method comprising the following steps (1) to (3).

Step (1): A step of preparing a mixed liquid containing the polymer having ion exchange groups, water and the organic solvent, at a concentration of the polymer having ion exchange groups of from 12 to 30 mass % with a proportion of water of from 10 to 40 mass % based on the total amount of water and the organic solvent.

Step (2): A step of stirring the mixed liquid at a shear rate of at least 50 $s^{-1}$ with heating it to 100 to 150° C. to increase the viscosity of the mixed liquid, and keeping stirring until the viscosity of the mixed liquid is decreased and stabilized.

Step (3): As the case requires, a step of adding a dispersion medium to the liquid composition to adjust the concentration of the polymer having ion exchange groups to from 10 to 26 mass %.

Step (1):

The concentration of the polymer having ion exchange groups is from 12 to 30 mass %, preferably from 16 to 28 mass %. When the concentration of the polymer having ion exchange groups is at least the lower limit value of the above range, an increase of the viscosity of the mixed liquid is likely to occur in the step (2). When the concentration of the polymer having ion exchange groups is at most the upper limit value of the above range, after the viscosity of the mixed liquid is increased in the step (2), the viscosity of the mixed liquid is likely to be decreased and stabilized.

The proportion of water is preferably from 10 to 40 mass %, more preferably from 10 to 30 mass % based on the total amount of water and the organic solvent.

When the proportion of water and the organic solvent is within the above range, an increase of the viscosity of the mixed liquid is likely to occur in the step (2). Further, after the viscosity of the mixed liquid is increased in the step (2), the viscosity of the mixed liquid is likely to be decreased and stabilized.

Step (2):

By keeping stirring of the mixed liquid at a predetermined temperature at a predetermined shear rate, the viscosity of the mixed liquid starts increasing suddenly.

This is because the polymer having ion exchange groups is subjected to shearing in a swollen state and becomes in a continuous phase, whereby a viscosity increase occurs, and the polymer is subjected to higher shearing force, whereby the primary particle size starts becoming large. Then, by further keeping stirring the mixed liquid under the same conditions, the viscosity of the mixed liquid is decreased and stabilized. This is because the polymer having ion exchange groups is dispersed in the dispersion medium and the polymer is no more in the continuous phase. The mixed liquid being stabilized means that the viscosity of the mixed liquid will be no more significantly increased even if stirring is kept.

The temperature of the mixed liquid at the time of stirring is from 100 to 150° C., more preferably from 105 to 125° C. When the temperature of the mixed liquid is within the above range, an increase of the viscosity of the mixed liquid is likely to occur in the step (2). Further, after the viscosity of the mixed liquid is increased in the step (2), the viscosity of the mixed liquid is likely to be decreased and stabilized.

The shear rate at the time of stirring is at least 50 s$^{-1}$, preferably from 50 to 1,000 s$^{-1}$, more preferably from 50 to 300 s$^{-1}$. When the shear rate is at least the lower limit value of the above range, an increase of the viscosity of the mixed liquid is likely to occur in the step (2). When the shear rate is at most the upper limit value of the above range, after the viscosity of the mixed liquid is increased in the step (2), the viscosity of the mixed liquid is likely to be decreased and stabilized.

Step (3):

The additional dispersion medium contains at least one of water and the organic solvent.

The amount of the dispersion medium added is not particularly limited so long as the proportion of water and the organic solvent in the dispersion medium in the liquid composition to be finally obtained is within the above-described preferred range.

(Application of Liquid Composition)

The liquid composition of the present invention is suitable for formation of a catalyst layer and a polymer electrolyte membrane in a membrane/electrode assembly. Further, it is also useful for formation of other membranes (such as a proton permselective membrane to be used for e.g. water electrolysis, hydrogen peroxide production, ozone production or waste acid recovery, an ion exchange membrane for electrolysis of sodium chloride, a diaphragm for a redox flow cell, and a cation exchange membrane for electrodialysis to be used for desalination or salt production.)

(Advantageous Effects)

In the above-described liquid composition of the present invention, which contains a polymer having ion exchange groups, water and an organic solvent, wherein the average secondary particle size of the polymer having ion exchange groups is at least 100, and the primary particle size parameter indicating the primary particle size corrected by the ion exchange capacity of the polymer having ion exchange groups is at least 12, relatively large primary particles are agglomerated to form secondary particles having a certain size. Accordingly, it is considered that in a catalyst layer or a polymer electrolyte membrane formed from the liquid composition of the present invention containing such secondary particles, a network by particles of the polymer having ion exchange groups is likely to form, whereby the catalyst layer and the polymer electrolyte membrane will hardly be broken.

<Polymer Electrolyte Membrane>

The polymer electrolyte membrane is a membrane containing a polymer having ion exchange groups.

The polymer electrolyte membrane of the present invention is a polymer electrolyte membrane formed from the liquid composition of the present invention.

The polymer having ion exchange groups may, for example, be the above-described perfluoropolymer having ion exchange groups, preferably the polymer (H) or the polymer having —SO$_2$F groups of the polymer having the units (m3) and TFE units converted to sulfonic acid groups, and is particularly preferably the polymer (H).

The polymer electrolyte membrane may be reinforced by a reinforcing material. The reinforcing material may, for example, be a porous body, fibers, woven fabric or nonwoven fabric. The material for the reinforcing material may, for example, be polytetrafluoroethylene, a tetrafluoroethylene/hexafluoropropylene copolymer, a tetrafluoroethylene/perfluoro(alkyl vinyl ether) copolymer, polyethylene, polypropylene or polyphenylene sulfide.

The polymer electrolyte membrane may further contains at least one type of atoms selected from the group consisting of cerium and manganese in order to further improve the durability. Cerium and manganese will decompose hydrogen peroxide which is a substance to cause deterioration of the polymer electrolyte membrane. Such cerium or manganese is preferably present in the form of ions in the polymer electrolyte membrane, and so long as it is present in the form of ions, it may be present in any state in the polymer electrolyte membrane.

(Method for Producing Polymer Electrolyte Membrane)

The polymer electrolyte membrane may be formed, for example, by a method (casting method) of applying a liquid composition onto a substrate film or a catalyst layer, followed by drying. The liquid composition is a dispersion having a polymer having ion exchange groups dispersed in a dispersion medium containing water and an organic solvent.

The method for producing the polymer electrolyte membrane of the present invention is a production method using the liquid composition of the present invention as the liquid composition. That is, the method for producing the polymer electrolyte membrane of the present invention comprises applying the liquid composition of the present invention onto a substrate, and removing water and the organic solvent. The substrate may, for example, be the substrate film or the catalyst layer.

It is preferred to carry out annealing to stabilize the polymer electrolyte membrane. The annealing temperature is preferably from 130 to 200° C., thought it depends on the kind of the polymer having ion exchange groups. When the annealing temperature is at least 130° C., the polymer having ion exchange groups does not hydrate excessively. When the annealing temperature is at most 200° C., thermal decomposition of ion exchange groups can be suppressed.

<Membrane/Electrode Assembly>

FIG. 1 is a cross sectional view illustrating an example of a membrane/electrode assembly of the present invention. A membrane/electrode assembly 10 comprises an anode 13 having a catalyst layer 11 and a gas diffusion layer 12, a cathode 14 having a catalyst layer 11 and a gas diffusion layer 12, and a polymer electrolyte membrane 15 disposed between the anode 13 and the cathode 14 in contact with the catalyst layers 11.

(Catalyst Layers)

The catalyst layer is a layer containing a catalyst and a polymer having ion exchange groups.

The catalyst may, for example, be a supported catalyst having platinum or a platinum alloy supported on a carbon carrier.

The carbon carrier may be carbon black powder.

The polymer having ion exchange groups may, for example, be the above-described perfluoropolymer having ion exchange groups, and is preferably the above-described polymer (H).

(Gas Diffusion Layers)

The gas diffusion layer has a function to uniformly diffuse gas through the catalyst layer and a function as a current collector.

The gas diffusion layer may, for example, be carbon paper, carbon cloth or carbon felt.

The gas diffusion layer is preferably made water repellent by treatment with e.g. polytetrafluoroethylene.

(Carbon Layer)

Figure 2:
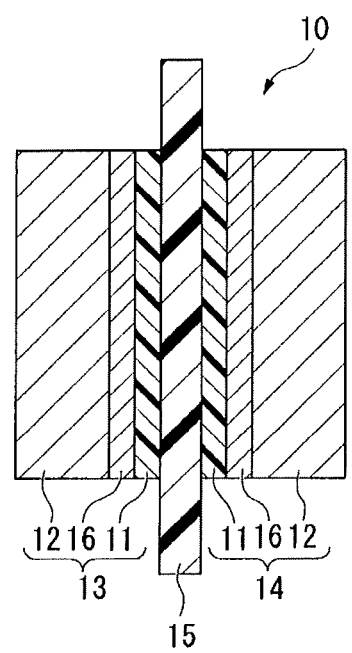
FIG. 2 is a cross sectional view illustrating another example of a membrane/electrode assembly of the present invention.

The membrane/electrode assembly 10 may have a carbon layer 16 between the catalyst layer 11 and the gas diffusion layer 12, as shown in FIG. 2.

By disposing the carbon layer, it is possible to improve the gas diffusion property on the surface of the catalyst layer and to substantially improve the power generation performance of the polymer electrolyte fuel cell.

The carbon layer is a layer containing carbon and a nonionic fluorinated polymer.

The carbon may, for example, be carbon particles or carbon fibers and is preferably carbon nanofibers having a diameter of from 1 to 1,000 nm and a fiber length of at most 1,000 μm.

The nonionic fluorinated polymer may, for example, be polytetrafluoroethylene.

(Method for Producing Membrane/Electrode Assembly)

When the membrane/electrode assembly has no carbon layer, the membrane/electrode assembly is produced, for example, by the following methods.

a method which comprises forming catalyst layers on a polymer electrolyte membrane to form a membrane/catalyst layer assembly, and sandwiching the membrane/catalyst layer assembly between gas diffusion layers.

a method which comprises forming catalyst layers on gas diffusion layers to form electrodes (an anode and a cathode) and sandwiching a polymer electrolyte membrane between the electrodes.

When the membrane/electrode assembly has a carbon layer, the membrane/electrode assembly is produced, for example, by the following methods.

a method which comprises applying a dispersion containing carbon and a nonionic fluorinated polymer onto substrate films, followed by drying to form carbon layers, forming catalyst layers on the carbon layers, then bonding the catalyst layers and a polymer electrolyte membrane, followed by peeling off the substrate films to obtain a membrane/catalyst layer assembly having carbon layers, and sandwiching the membrane/catalyst layer assembly between gas diffusion layers.

a method which comprises applying dispersion containing carbon and a nonionic fluorinated polymer onto gas diffusion layers, followed by drying to form carbon layers, and sandwiching a membrane/catalyst layer assembly having catalyst layers formed on a polymer electrolyte membrane, between the gas diffusion layers having carbon layers.

(Method for Forming Catalyst Layer)

The catalyst layers may be formed, for example, by the following methods.

a method which comprises applying a catalyst layer-forming coating liquid onto a polymer electrolyte membrane, a gas diffusion layer or a carbon layer, followed by drying.

a method which comprises applying a catalyst layer-forming coating liquid onto a substrate film, followed by drying to form a catalyst layer, and transferring the catalyst layer onto a polymer electrolyte membrane.

The catalyst layer-forming coating liquid is a liquid having a polymer having ion exchange groups and a catalyst dispersed in a dispersion medium. The catalyst layer-forming coating liquid may be prepared, for example, by mixing the liquid composition of the present invention and a dispersion of the catalyst.

The membrane/electrode assembly of the present invention is characterized in that the catalyst layer or the polymer electrolyte membrane is formed from the liquid composition of the present invention. Both of the catalyst layer and the polymer electrolyte membrane may be formed from the liquid composition of the present invention.

That is, the membrane/electrode assembly of the present invention is a membrane/electrode assembly for a polymer electrolyte fuel cell, which comprises an anode having a catalyst layer, a cathode having a catalyst layer and a polymer electrolyte membrane disposed between the anode and the cathode, wherein the catalyst layer of at least one of the cathode and the anode is a catalyst layer formed from a mixed liquid of the liquid composition of the present invention and a catalyst.

Further, the membrane/electrode assembly of the present invention is a membrane/electrode assembly for a polymer electrolyte fuel cell, which comprises an anode having a catalyst layer, a cathode having a catalyst layer and a polymer electrolyte membrane disposed between the anode and the cathode, wherein the polymer electrolyte membrane is a polymer electrolyte membrane formed from the liquid composition of the present invention.

The polymer having ion exchange groups in the liquid composition of the present invention may, for example, be the above-described perfluoropolymer having ion exchange groups, and is preferably the above-described polymer (H).

The method for producing a membrane/electrode assembly of the present invention is a method in which the catalyst layer or the polymer electrolyte membrane is produced by using the liquid composition of the present invention. Both of the catalyst layer and the polymer electrolyte membrane may be produced by using the liquid composition of the present invention.

That is, the method for producing a membrane/electrode assembly of the present invention is a method for producing a membrane/electrode assembly for a polymer electrolyte fuel cell comprising an anode having a catalyst layer, a cathode having a catalyst layer and a polymer electrolyte membrane disposed between the anode and the cathode, which comprises preparing a mixed liquid containing the liquid composition of the present invention and a catalyst, and forming the catalyst layer of at least one of the cathode and the anode by using the mixed liquid.

Further, the method for producing a membrane/electrode assembly of the present invention is a method for producing a membrane/electrode assembly for a polymer electrolyte fuel cell comprising an anode having a catalyst layer, a cathode having a catalyst layer and a polymer electrolyte membrane disposed between the anode and the cathode, which comprises forming the polymer electrolyte membrane by using the liquid composition of the present invention.

The polymer having ion exchange groups in the liquid composition of the present invention may, for example, be the above-described perfluoropolymer having ion exchange groups, and is preferably the above-described polymer (H).

(Advantageous Effects)

According to the above-described method for producing a membrane/electrode assembly of the present invention, which uses the liquid composition of the present invention for formation of the catalyst layer or the polymer electrolyte membrane, the catalyst layer and the polymer electrolyte membrane will hardly be broken at the time of their formation.

<Polymer Electrolyte Fuel Cell>

By disposing a separator having grooves formed as gas flow paths, on both sides of the membrane/electrode assembly, a polymer electrolyte fuel cell is obtained.

The separator may be a separator made of various conductive material, such as a metal separator, a carbon separator, or a separator made of a mixture of graphite and a resin.

In the polymer electrolyte fuel cell, power generation is carried out by supplying a gas containing oxygen to the cathode, and a gas containing hydrogen to the anode. Further, the membrane/electrode assembly can be applied also to a methanol fuel cell for generating electric power by supplying methanol to the anode.

EXAMPLES

Now, the present invention will be described in further detail with reference to Examples, but the present invention is by no means limited by these Examples.

Ex. 1 to 6 are Examples of the present invention, and Ex. 7 to 14 are Comparative Examples.

In Comparative Examples, the polymer F-6 and the polymer F-7 are not the "polymer (F)" in this specification, and the polymer H-6 and the polymer H-7 are not the "polymer (H)" in this specification.

(Density)

The density of the polymer (F) was obtained by using a densimeter (manufactured by Alfa Mirage Co., Ltd., MD-300S) utilizing method of collecting gas over water. Specifically, the mass of the polymer (F) was measured in the air, and the mass of the polymer (F) submerged in water at 20° C. was measured. The specific gravity in water at 20° C. was obtained from these masses, which was calculated to the specific gravity in water at 4° C., which was taken as the density.

(Ion Exchange Capacity)

The ion exchange capacity of the polymer (H) was obtained by the following method.

The polymer (H) was put in a glove box and left to stand in a stream of dry nitrogen for at least 24 hours and dried. The dry mass of the polymer (H) was measured in the glove box.

The polymer (H) was immersed in a 2 mol/L aqueous sodium chloride solution and left to stand at 60° C. for one hour and then cooled to room temperature. The aqueous sodium chloride solution in which the polymer (H) was immersed was subjected to titration with a 0.5 mol/L aqueous sodium hydroxide solution to determine the ion exchange capacity of the polymer (H).

(Average Secondary Particle Size)

The liquid composition was diluted with ultrapure water to a solid content concentration of 0.2 mass % and left at rest for 16 hours to prepare a sample. By using a fiber optical dynamic light scattering spectrophotometer (manufactured by Otsuka Electronics Co., Ltd., FDLS-3000), the scattering intensity of a sample was measured under conditions of temperature: 25° C., sampling time: 100 μsec, number of channels: 1,024 and number of scanning: 100, and by cumulant expansion from the obtained autocorrelation function, the average secondary particle size of the polymer (H) in the liquid composition was calculated.

(Primary Particle Size Parameter)

The liquid composition was diluted to a solid content concentration of 10 mass % without changing the solvent composition to prepare a sample. Using a nanoscale X-ray structure evaluation apparatus (manufactured by Rigaku Corporation, NANO-Viewer), a small angle X-ray scattering (SAXS) profile of the sample was obtained. At the time of data processing, background correction at the time of IP reading, air scattering correction and transmission correction were conducted. The sample at the time of measuring the background scattering was 100% ethanol. By conducting fitting employing Gaussian function with respect to peak positions and vicinities thereof of the obtained scattering profile, a D value was calculated. The primary particle size parameter was calculated from the product of the D value and the ion exchange capacity.

(Membrane Cracking)

The liquid composition was diluted to a solid content concentration of 10 mass % without changing the solvent composition, and dropped on a glass petri dish in an amount such that the dry film thickness would be 50 μm. The liquid composition was air-dried for 16 hours and then heated at 80° C. for 30 minutes, whereupon membrane cracking was evaluated by presence or absence of cracks in the membrane.

(Compound (m1))

Preparation of Compound (m1-1):

Compound (m1-1) was prepared in accordance with the method disclosed in Example 1 of JP-A-2008-202039.

$$CF_2=CFOCF_2-CF\begin{matrix}CF_2OCF_2CF_2-SO_2F\\ \\ OCF_2CF_2-SO_2F\end{matrix} \quad (m1\text{-}1)$$

(Compound (m2))

Compound (m21-1)

$$\begin{matrix}FC=CF\\O\quad\quad O\\\diagdown C\diagup\\F_3C\quad CF_3\end{matrix} \quad (m21\text{-}1)$$

(Compound (m3))
Compound (m3-1):

Compound (m3-1)

$$CF_2=CFOCF_2CF-O-CF_2CF_2SO_2F \quad (m3\text{-}1)$$
$$\quad\quad\quad\quad\quad\quad |$$
$$\quad\quad\quad\quad\quad CF_3$$

(Radical Initiator)
  Compound (i-1):

$(C_3F_7COO)_2$          (i-1)

Compound (i-2):

$((CH_3)_2CHOCOO)_2$          (i-2)

(Solvent)
  Compound (s-1):

$CClF_2CF_2CHClF$          (s-1)

Compound (s-2):

$CH_3CCl_2F$          (s-2)

(Production of Polymer (H))
  Production of Polymer (H-1):

Into a stainless steel autoclave having an internal capacity of 125 ml, 15.74 g of compound (m21-1), 50.86 g of compound (m1-1) and 25.8 mg of compound (i-2) were charged, and the autoclave was sufficiently deaerated under cooling with liquid nitrogen. 2.6 g of TFE was charged, the temperature was increased to 40° C., followed by stirring for 24 hours, and the autoclave was cooled to terminate the reaction.

The product was diluted with compound (s-1), and mixed with n-hexane to agglomerate the polymer, followed by filtration. The polymer was stirred in compound (s-1) and re-agglomerated with n-hexane, and the solid content was vacuum-dried at 80° C. overnight to obtain polymer (F-1). The composition of structural units constituting the polymer (F-1) was analyzed by $^{19}$F-NMR. Further, the density of the polymer (F-1) was measured. The results are shown in Table 1.

The polymer (F-1) was immersed in an aqueous solution containing 20 mass % of methanol and 15 mass % of potassium hydroxide at 50° C. for 40 hours to hydrolyze and convert —SO$_2$F groups in the polymer (F-1) into —SO$_3$K groups. Then, the polymer was immersed in a 3 mol/L aqueous hydrochloric acid solution at room temperature for 2 hours. The aqueous hydrochloric acid solution was changed, and the same treatment was repeated 4 times to obtain polymer (H-1) having —SO$_3$K groups in the polymer converted to sulfonic acid groups. The polymer (H-1) was sufficiently washed with ultrapure water. The ion exchange capacity of the polymer (H-1) was measured. The results are shown in Table 1.

Production of Polymers (H-2) to (H-5):

Polymers (H-2) to (H-5) were produced in the same manner as the polymer (H-1) except that the amounts of the monomers charged were changed so that the proportions of the respective structural units were as identified in Table 1. The results are shown in Table 1.

Production of Polymer (H-6):

Into a stainless steel autoclave having an internal capacity of 125 ml, 66.93 g of compound (m3-1), 12.74 g of compound (m1-1) and 0.23 mg of compound (i-2) were charged, and the autoclave was sufficiently deaerated under cooling with liquid nitrogen. 1.34 g of TFE was charged, and the temperature was increased to 20° C., followed by stirring for 24 hours, and the autoclave was cooled to terminate the reaction.

The product was diluted with compound (s-1) and mixed with n-hexane to agglomerate the polymer, followed by filtration. The polymer was stirred in compound (s-1) and re-agglomerated with n-hexane, and the solid content was vacuum dried at 80° C. overnight to obtain polymer (F-6). The composition of structural units constituting the polymer (F-6) was analyzed by $^{19}$F-NMR. Further, the density of the polymer (F-6) was measured. The results are shown in Table 1.

Using the polymer (F-6), polymer (H-6) was obtained in the same manner as in Ex. 1. The ion exchange capacity of the polymer (H-6) was measured. The results are shown in Table 1.

Production of Polymer (H-7):

Into a stainless steel autoclave having an internal capacity of 125 ml, 49.64 g of compound (m3-1), 28.22 g of compound (s-1) and 38.9 mg of compound (i-1) dissolved in compound (s-1) at a concentration of 3.2 mass % were charged, and the autoclave was sufficiently deaerated under cooling with liquid nitrogen. Then, the temperature was increased to 30° C., and TFE was introduced into the system to maintain the pressure at 0.37 MPaG. Stirring was conducted for 4.8 hours, and the autoclave was cooled to terminate the reaction.

The product was diluted with compound (s-1) and mixed with compound (s-2) to agglomerate the polymer, followed by filtration. Then, the polymer was stirred in compound (s-1), re-agglomerated with compound (s-2) and vacuum dried at 80° C. overnight to obtain polymer (F-7). The composition of structural units constituting the polymer (F-7) was analyzed by $^{19}$F-NMR. Further, the density of the polymer (F-7) was measured. The results are shown in Table 1.

Using the polymer (F-7), polymer (H-7) was obtained in the same manner as in Ex. 1. The ion exchange capacity of the polymer (H-7) was measured. The results are shown in Table 1.

TABLE 1

| Polymer | Constituting units [mol %] | | | | Density [g/cm³] | Polymer | Ion exchange capacity [meq/g dry resin] |
|---|---|---|---|---|---|---|---|
| (F) | (m21-1) | (m1-1) | (m3-1) | TFE | | (H) | |
| (F-1) | 67 | 17 | — | 16 | 1.99 | (H-1) | 1.19 |
| (F-2) | 33 | 15 | — | 52 | 2.02 | (H-2) | 1.19 |
| (F-3) | 32 | 16 | — | 52 | 2.02 | (H-3) | 1.38 |
| (F-4) | 68 | 18 | — | 14 | 1.98 | (H-4) | 1.21 |
| (F-5) | 68 | 16 | — | 16 | 1.98 | (H-5) | 1.12 |
| (F-6) | 66 | — | 31 | 3 | 1.98 | (H-6) | 1.02 |
| (F-7) | — | — | 18 | 82 | 2.06 | (H-7) | 1.13 |

Ex. 1

Step (1): To the polymer (H-1), a mixed solvent of 1-propanol and water (1-propanol/water=70/30 mass ratio) was added to obtain a mixed liquid having a solid content concentration adjusted to 22 mass %.

Step (2): Using an autoclave, the mixed liquid was stirred at a temperature of 115° C. at a shear rate of 100 s$^{-1}$. 3 Hours later, the viscosity of the mixed liquid increased 7 times, and decreased to the original viscosity in about 30 minutes and was stabilized.

Step (3): 8 Hours after the start of stirring, water was added to the mixed liquid to adjust the solid content concentration to 16 mass % to obtain a liquid composition having the polymer (H-1) dispersed in the dispersion medium.

Using the obtained liquid composition, the membrane cracking was evaluated. The results are shown in Table 2.

Ex. 2 to 14

Liquid compositions were obtained in the same manner as in Ex. 1 except that the type of the polymer (H) and the conditions in the steps (1) to (3) were as identified in Table 2. Using the obtained liquid compositions, membrane cracking was evaluated. The results are shown in Table 2.

TABLE 2

| | | Step (1) | | Step (2) | | |
|---|---|---|---|---|---|---|
| | | Solid content | Dispersion medium | | | |
| Ex. | Polymer (H) | concentration [mass %] | 1-propanol/water [mass ratio] | Shear rate [s$^{-1}$] | Temperature [° C.] | Viscosity increase |
| 1 | (H-1) | 22 | 70/30 | 100 | 115 | Increased |
| 2 | (H-1) | 22 | 70/30 | 400 | 115 | Increased |
| 3 | (H-1) | 14 | 85/15 | 100 | 115 | Increased |
| 4 | (H-2) | 17 | 70/30 | 200 | 115 | Increased |
| 5 | (H-3) | 24 | 70/30 | 100 | 115 | Increased |
| 6 | (H-4) | 22 | 70/30 | 100 | 115 | Increased |
| 7 | (H-1) | 11 | 70/30 | 100 | 115 | Nil |
| 8 | (H-1) | 22 | 70/30 | 35 | 115 | Nil |
| 9 | (H-1) | 31 | 70/30 | 100 | 115 | Increased |
| 10 | (H-1) | 22 | 50/50 | 100 | 115 | Nil |
| 11 | (H-1) | 22 | 70/30 | 100 | 115 | Increased |
| 12 | (H-5) | 15 | 70/30 | 100 | 95 | Nil |
| 13 | (H-6) | 20 | 70/30 | 100 | 95 | Nil |
| 14 | (H-7) | 22 | 60/40 | 100 | 105 | Increased |

| | Liquid composition after step (3) | | | | |
|---|---|---|---|---|---|
| | Solid content concentration [mass %] | Dispersion medium 1-propanol/water [mass ratio] | Average secondary particle size [nm] | D value [nm] | Primary particle size parameter | Membrane cracking |
| Ex. | | | | | | |
| 1 | 16 | 50/50 | 240 | 10.8 | 12.85 | ○ |
| 2 | 16 | 50/50 | 170 | 10.7 | 12.73 | ○ |
| 3 | 10 | 50/50 | 190 | 10.6 | 12.61 | ○ |
| 4 | 10 | 50/50 | 1300 | 10.5 | 12.50 | ○ |
| 5 | 18 | 50/50 | 300 | 9.1 | 12.56 | ○ |
| 6 | 16 | 50/50 | 250 | 10.1 | 12.22 | ○ |
| 7 | 10 | 63/37 | 250 | 9.8 | 11.66 | X |
| 8 | 16 | 50/50 | 550 | 9.9 | 11.78 | X |
| 9 | — | — | — | — | — | — |
| 10 | — | — | — | — | — | — |
| 11 | 10 | 0/100 | 170 | 12.3 | 14.64 | X |
| 12 | 10 | 50/50 | 180 | 10.5 | 11.76 | X |
| 13 | 10 | 50/50 | 500 | 9.1 | 9.28 | X |
| 14 | 10 | 0/100 | 150 | 15.7 | 17.74 | X |

Figure 3:
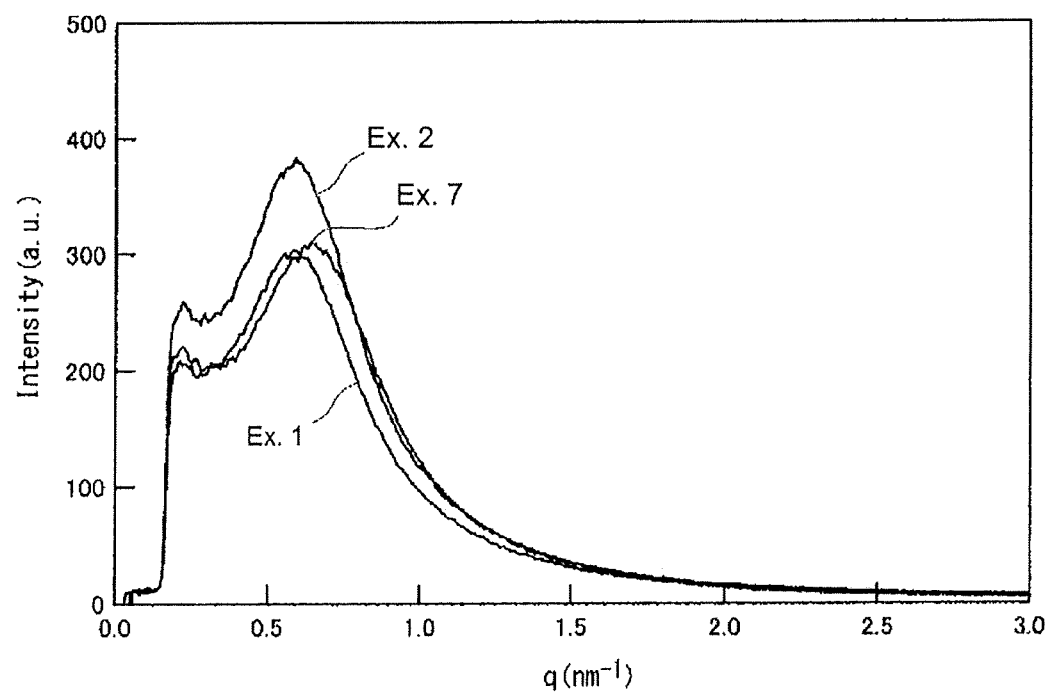
FIG. 3 is a scattering profile of small angle S-ray scattering (SAXS) obtained with respect to liquid compositions in Ex. 1, 2 and 7.

Small angle X-ray scattering profiles obtained with respect to the liquid compositions in Ex. 1, 2 and 7 are shown in FIG. 3.

In Ex. 7, an increase of the viscosity of the mixed liquid in the step (2) was not observed since the solid content concentration of the polymer (H-1) in the mixed liquid in the step (1) was too low. The primary particle size parameter of the polymer (H-1) in the obtained liquid composition was smaller than the primary particle size parameter of the polymer (H-1) in the liquid composition in Ex. 1, and in evaluation of membrane cracking, cracks were observed in the membrane.

In Ex. 8, an increase of the viscosity of the mixed liquid in the step (2) was not observed since the shear rate in the step (2) was too low. The primary particle size parameter of the polymer (H-8) in the obtained liquid composition was small, and in evaluation of membrane cracking, cracks were observed in the membrane.

In Ex. 9, the viscosity of the mixed liquid remained increased in the step (2), since the solid content concentration of the polymer (H-1) in the mixed liquid was too high in the step (1). Evaluation of the liquid composition was not conducted.

In Ex. 10, an increase of the viscosity of the mixed liquid was not observed in the step (2), since the proportion of the organic solvent was low in the step (1). Further, large particles of the polymer (H-1) remained non-dispersed. Evaluation of the liquid composition was not conducted.

In Ex. 11 and 14, the dispersion medium of the liquid composition finally obtained was only water. Since no organic solvent was contained, in evaluation of membrane cracking, cracks were observed in the membrane.

In Ex. 12 and 13, an increase of the viscosity of the mixed liquid was not observed in the step (2) since the temperature in the step (2) was too low. The primary particle size parameter of the polymer (H) in the obtained liquid composition was small, and in evaluation of membrane cracking using the liquid composition, cracks were observed in the membrane.

INDUSTRIAL APPLICABILITY

The liquid composition of the present invention is useful as a material for formation of a catalyst layer and a polymer electrolyte membrane in a membrane/electrode assembly.

REFERENCE SYMBOLS

10: Membrane/electrode assembly, 11: catalyst layer, 12: gas diffusion layer, 13: anode, 14: cathode, 15: polymer electrolyte membrane, 16: carbon layer

What is claimed is:

1. A liquid composition comprising
a polymer having ion exchange groups,
water, and
an organic solvent,
wherein
the polymer has an average secondary particle size of from 100 to 3,000 nm,
the polymer has a primary particle size parameter represented by a product of an average primary particle size (nm) and ion exchange capacity (meq/g dry resin) of from 12 to 20,
a proportion of water is from 10 to 60 mass % based on the total amount of water and the organic solvent,
the polymer having ion exchange groups has structural units having an ion exchange group and structural units based on a perfluoromenoene monomer having a 5-membered ring or a perfluorodiene monomer capable of forming a 5-membered ring by cyclopolymerization, and
the ion exchange capacity of the polymer having ion exchange groups is from 1.1 to 2.0 meq/g dry resin.

2. The liquid composition according to claim 1, wherein the organic solvent contains at least one $C_{1-4}$ alcohol.

3. The liquid composition according to claim 1, wherein the polymer is a perfluoropolymer having ion exchange groups.

4. The liquid composition according to claim 1, wherein
the polymer having ion exchange groups is a polymer obtained by converting precursor groups of polymer (F) into ion exchange groups, and
the polymer (F) is a polymer having structural units based on a perfluoromonomer having a precursor group represented by formula (g1), and the structural units based on a perfluoromonoene monomer having a 5-membered ring or a perfluorodiene monomer capable of forming a 5-membered ring by cyclopolymerization:

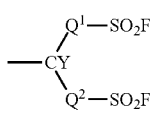

(g1)

$Q^1$ is a perfluoroalkylene group which optionally has an etheric oxygen atom, $Q^2$ is a single bond or a perfluoroalkylene group which optionally has an etheric oxygen atom, and Y is a fluorine atom or a monovalent perfluoroorganic group.

5. The liquid composition according to claim 4, wherein the polymer (F) further has structural units based on tetrafluoroethylene.

6. The liquid composition according to claim 1, wherein a concentration of the polymer in the liquid composition is from 10 to 26 mass %.

7. A method for producing the liquid composition according to claim 1, the method comprising:
preparing a mixed liquid containing the polymer, water and the organic solvent, at a concentration of the polymer of from 12 to 30 mass % with a proportion of water of from 10 to 40 mass % based on a total amount of water and the organic solvent; and
stirring the mixed liquid at a shear rate of at least 50 $s^{-1}$ and heating the mixed liquid to 100 to 150° C. to increase the viscosity of the mixed liquid, and keeping stirring until the viscosity of the mixed liquid is decreased and stabilized.

8. A polymer electrolyte membrane formed from the liquid composition according to claim 1.

9. A method for producing a polymer electrolyte membrane, the method comprising
applying the liquid composition according to claim 1 to a substrate, and
removing water and the organic solvent.

10. A membrane/electrode assembly for a polymer electrolyte fuel cell, the assembly comprising
an anode having a catalyst layer,
a cathode having a catalyst layer, and
a polymer electrolyte membrane disposed between the anode and the cathode,
wherein at least one catalyst layer of the cathode and the anode is a catalyst layer formed from a mixed liquid of the liquid composition according to claim 1 and a catalyst.

11. A method for producing the membrane/electrode assembly according to claim 10, the method comprising
mixing the liquid composition and the catalyst to obtain the mixed liquid, and
forming the catalyst layer of at least one of the cathode and the anode by using the mixed liquid.

12. A membrane/electrode assembly for a polymer electrolyte fuel cell, the assembly comprising
an anode having a catalyst layer,
a cathode having a catalyst layer, and
a polymer electrolyte membrane disposed between the anode and the cathode,
wherein the polymer electrolyte membrane is formed from the liquid composition according to claim 1.

13. A method for producing the assembly according to claim 12, the method comprising
forming the polymer electrolyte membrane by using the liquid composition.

14. The liquid composition according to claim 1, obtained by a method comprising:
preparing a mixed liquid containing the polymer, water and the organic solvent, at a concentration of the polymer of from 12 to 30 mass % with a proportion of water of from 10 to 40 mass % based on a total amount of water and the organic solvent; and
stirring the mixed liquid at a shear rate of at least 50 $s^{-1}$ and heating the mixed liquid to 100 to 150° C. to increase viscosity of the mixed liquid, and keeping stirring until the viscosity of the mixed liquid is decreased and stabilized.

15. The liquid composition according to claim 14, the method further comprising:
adding an additional dispersion medium to the liquid composition to adjust the concentration of the polymer having ion exchange groups to from 10 to 26 mass %.

16. The liquid composition according to claim 1, wherein the proportion of water is from 10 to 40 mass % based on the total amount of water and the organic solvent.

* * * * *